United States Patent [19]

Killian

[11] 4,080,844

[45] Mar. 28, 1978

[54] MANUAL CONTROL APPARATUS

[75] Inventor: Henry R. Killian, Sugarland, Tex.

[73] Assignee: Keystone International, Inc., Houston, Tex.

[21] Appl. No.: 712,371

[22] Filed: Aug. 9, 1976

[51] Int. Cl.² .............................................. F16H 1/18
[52] U.S. Cl. ................................................. 74/424.8 A
[58] Field of Search ................................... 74/424.8 A

[56] References Cited

U.S. PATENT DOCUMENTS

| | | | |
|---|---|---|---|
| 1,905,569 | 4/1933 | Rapellin | 74/424.8 A |
| 2,001,057 | 5/1935 | Fellay | 74/424.8 A |
| 2,373,097 | 4/1945 | Boyles et al. | 74/424.8 A |
| 3,733,914 | 5/1973 | Sheesley | 74/424.8 A |
| 3,961,547 | 6/1976 | Shainberg | 74/424.8 A |

*Primary Examiner*—Benjamin W. Wyche
*Assistant Examiner*—Wesley S. Ratliff, Jr.
*Attorney, Agent, or Firm*—Browning, Bushman & Zamecki

[57] ABSTRACT

A manual override apparatus for use with normally, automatically, powered driving assemblies such as valve actuators, the override apparatus having a body with a bore therethrough, a housing secured to the body and having an axial bore which registers with the bore in the body, a rotatable split drive nut mounted in the housing, a drive screw extending into the registering pores in the body and the housing and mounted for axial movement therein, and a camming system for selectively engaging and disengaging the drive nut with the drive screw whereby engagement of the drive screw with the drive nut and rotation of the drive nut causes axial movement of the drive screw.

18 Claims, 6 Drawing Figures

MANUAL CONTROL APPARATUS

BACKGROUND OF THE INVENTION

The present invention pertains to manual control devices. More specifically, the present invention relates to a selectively engagable manual drive apparatus for use with a normally, automatically powered driving assembly having a moveable member and a stationary member.

Automatically powered driving assemblies such as actuators of the type used to control valves typically employ reciprocating movement of a member such as a piston in a suitable chamber formed by a housing. Actuators of the type described are particularly useful with butterfly or ball valves which employ rotating valve elements.

Piston-cylinder type actuators used for automatic actuation of valves and other various devices typically employ hydraulic or pneumatic power. Since these power sources may from time to time fail, it becomes not only desirable, but in many cases necessary, to provide a means to manually control or override the actuator so as to be able, for example, to open or close the valve which is attached to the actuator. While such manual override means are known, most consume excessive amounts of space, are awkward to operate and are quite expensive.

SUMMARY OF THE INVENTION

It is therefore an object of the present invention to provide a selectively engageable manual drive apparatus for use with a normally powered driving assembly.

Another object of the present invention is to provide a selectively engageable manual drive apparatus for use with a normally powered driving assembly of the piston-cylinder type.

Another object of the present invention is to provide a manual override for an actuator having a moveable drive member and a stationary member.

An important object of the present invention is to provide a manual override apparatus which can be readily adapted to many standard types of cylinder actuators with a minimum amount of modification in the basic components of the actuator.

Other objects, features, and advantages of the present invention will become apparent from the description given herein, the drawings and the appended claims.

The selectively engageable manual drive apparatus of the present invention is comprised of a body having a bore therethrough and a housing secured to the body and having an axial bore registering with the bore in the body. Rotatable drive nut means are mounted in the housing and a drive screw means extends along the registering bores in the body and the housing and is mounted for axial movement therein. The apparatus also includes means for selectively engaging and disengaging the drive nut means and the drive screw means, engagement and rotation of the drive nut means resulting in axial movement of the drive screw means longitudinally through the registering bores. Preferably the drive screw is adapted to be connected to a suitable connector rod which extends out of the body and which in turn is connectable to the moveable member of an actuator such as for example the piston rod in a piston-cylinder actuator normally operated pneumatically or hydraulically.

DESCRIPTION OF THE PREFERRED EMBODIMENTS

Figures 1, 6:
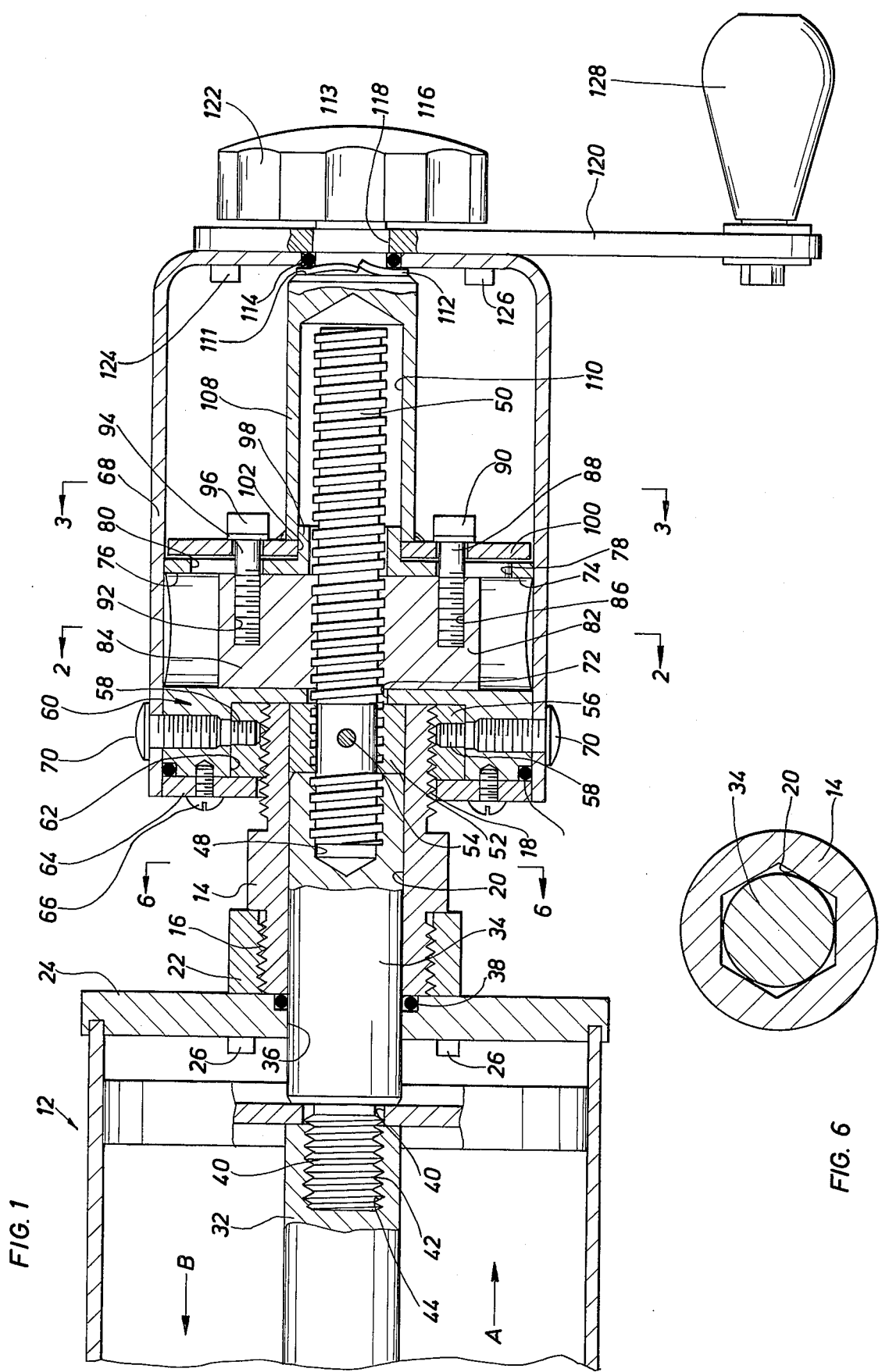
FIG. 1 is a side elevational view, partly in section, showing the manual override apparatus of the present invention connected to a typical piston-cylinder type actuator.
FIG. 6 is a view taken along the line 6—6 of FIG. 1.

Referring then to FIG. 1, the manual override apparatus of the present invention, shown generally as 10, is connected to a piston-cylinder type actuator, shown generally as 12. Override apparatus comprises a body 14 having externally threaded end portions 16 and 18. Body 14 also has a bore 20 extending therethrough, bore 20 being broached, as seen in FIG. 6, so as to have a generally hexagonal cross-sectional shape.

Threadedly received on the threaded end 16 of body 14 is a rectangular mounting flange 22. Mounting flange 22 is secured to the end cap 24 of actuator 12 by means of bolts 26. End cap 24 and a cylindrical housing 26 cooperate to form a cylinder 28. A piston 30 is slidably mounted in cylinder 28 and is secured to piston rod 32. Piston 30 reciprocates in chamber 28 in the directions shown by arrows A and B. It will be understood that power to move piston 30 is supplied in the conventional manner by hydraulic or pneumatic power. It will also be appreciated that actuator 12 can be single acting or double acting and will have suitable linkage connecting the actuator with the valve to effect operation of the latter movement.

A connecting rod 34 extends out of body 14 and through an aperture 36 in end cap 24, sealing around connecting rod 34 being provided by O-ring 38. Connecting rod 34 has a reduced diameter end portion 40 which is threaded as shown at 42 and is received in a tapped bore 44 in piston rod 32, reduced end portion 40 extending through an opening 46 in piston 30.

The other end of connecting rod 34 has a tapped bore 48 in which is received a threaded drive screw 50. A hexagonal nut 52 is threaded onto drive screw 50 and is prevented from relative rotation therewith by means of a pin 54 which keys screw 50 and nut 52 together.

Threadedly secured to the threaded end 18 of body 14 is a thrust collar 56, thrust collar 56 being fixed against movement relative to threaded portion 18 by means of set screws 58. A housing, shown generally as 60, has a counterbore 62 which has a diameter slightly larger than the outside diameter of collar 56, collar 56 being received in counterbore 62. A retaining plate 64 is affixed to housing 60 by means of screws 66 extending through plate 64 and received in tapped bores in housing 60. Also secured to housing 60 is a housing cover 68, cover 68 being fastened by means of bolts 70 extending through suitable holes in housing cover 68 and received in tapped bores in housing 60. Sealing between housing 60, retainer plate 64 and housing cover 68 is accomplished by means of an O-ring 70. It can be seen that housing 60 together with retaining plate 64 and housing cover 68 can rotate relative to body 14, collar 56 serving as a bearing therefore.

Housing 60 is provided with a bore 72 which is generally in register with bore 20 through body 14 and which also receives screw 50. Housing 60 also has coaxial bores 74 and 76 disposed on diametrically opposite sides of bore 72. Thus, bores 74 and 76 actually form a single bore which is transverse to bore 72. Housing 60 also has a pair of slots 78 and 80 which are aligned generally parallel to the axes of bores 74 and 76, respectively.

One half 82 of a split drive nut is slidably positioned in bore 74 so as to be moveable toward and away from axial bore 72 and hence drive screw 50. The second half 84 of the split drive nut is slidably positioned in bore 76 to likewise move in a direction toward and away from drive screw 50. Drive nut half 82 has a tapped bore 86 which receives a threaded cam pin 88 having a head 90. Likewise, drive nut half 84 has a tapped bore 92 which receives a threaded cam pin 94 having a head 96. It will be seen that pins 94 and 88 extend through slots 80 and 78, respectively, and are aligned generally axially with drive screw 50. Housing 60 is also provided with an axially extending boss 98 through which extends drive screw 50. A cam plate 100 having a circular aperture 102 snugly encircles boss 98.

Figure 2:
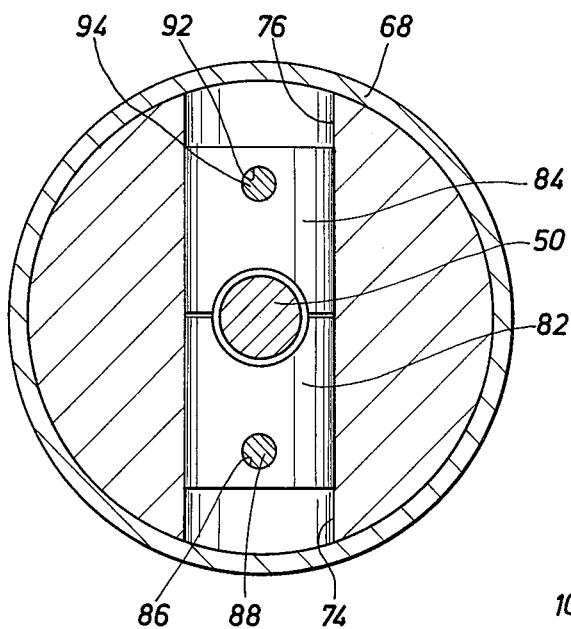
FIG. 2 is a view taken along the line 2—2 of FIG. 1 showing the drive nut means and drive screw means engagement.
Figure 3:
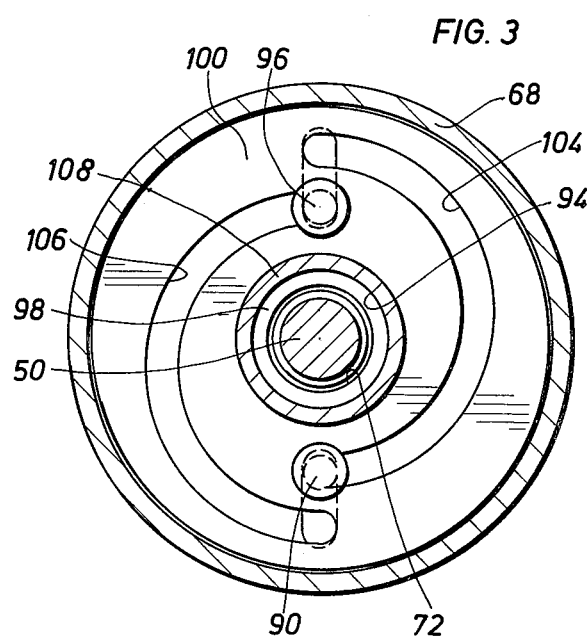
FIG. 3 is a view taken along the line 3—3 of FIG. 1 showing the position of the camming plate when the drive nut means and drive screw means are engaged.

As best seen with reference to FIG. 3, cam plate 100 has cam surfaces provided by arcuate slots 104 and 106. Slots 104 and 106 are eccentric with respect to one another, to axial bore 72 and aperture 102. Cam pins 88 and 94 extend through slots 104 and 106, respectively, heads 90 and 96 serving to hold cam plate 100 in sliding engagement with housing 60. It can thus be seen that cam plate 100 can be rotated relative to housing 60 between terminal positions determined by the travel of cam pins 88 and 94 in slots 106 and 104, respectively. Plate 100 can be releasably held in the respective terminal positions by detent means will known in the art. As best seen in FIG. 3, slots 104 and 106 are disposed relative to one another such that any rotational movement of plate 100 relative to housing 60 around the longitudinal axis of bore 72 will move pins 94 and 88 and hence drive nut halves 84 and 82 an equal distance either toward or away from screw 50 depending on the direction of rotation of plate 100. Since screw 50 and bore 72 are coaxial, relative rotation of plate 100 and housing 60 in the proper direction will move nut halves 84 and 82 into full threaded engagement with screw 50. (See FIG. 2) Secured by keyed engagement or other suitable means to cam plate 100, adjacent boss 98, is hollow engagement rod 108, rod 108 having a bore 110 therein which is generally concentric with bores 72 and 20. Connectiong rod 108 has a reduced diameter neck portion 112 which extends through an opening 114 in housing cover 68, an O-ring 116 providing sealing between opening 114 and neck portion 112. An annular wave spring 113 encircles neck portion 112 and is compressed between housing cover 68 and shoulder 111 formed on rod 108. Neck portion 112 also extends through an opening 118 in lever arm 120 and into an engaging knob 122, neck portion 112 being secured to knob 122 in a well known manner whereby rotation of knob 122 results in rotation of rod 108. Lever arm 120 is secured to housing cover 68 by bolts 124 and 126, a handle 128, being rotatably mounted on the end of lever arm 120.

OPERATION

Referring to FIGS. 1, 2 and 3, it can be seen that split drive nut halves 82 and 84 are in threaded engagement with drive screw 50. Accordingly, if handle 128 is now used to turn lever arm 120, housing 68 being rigidly attached thereto, will also rotate. Rotation of housing cover 68 will result in the rotation of housing 60. Drive nut halves 82 and 84 being disposed in bores 74 and 76, respectively, of housing 60 will also rotate with housing 60. Rotation of drive nut halves 82 and 84 will cause drive screw 50 to move axially through bores 20, 72, and 110, the direction of travel of screw 50 being dependent on the direction in which lever 120 is rotated. Since drive screw 50 is threadedly connected to connecting rod 34, axial movement of drive screw 50 is translated into axial movement of connecting rod 34 which, being connected to piston rod 32, results in longitudinal movement of piston 30, in the direction shown by arrows A or B depending upon which direction lever arm 120 is being rotated. It is to be observed that the provision of nut 52 which keys drive screw 50 to bore 20 prevents torsional load from being transferred to actuator 12 via screw 50. Thus, actuator 12 is subjected only to the axial thrust supplied by screw 50. In this mode, manual override apparatus 10 is then being used to move moveable member 30 of actuator 12 relative to the stationary member (end cap 24 and housing 26) i.e. actuator 12 is being manually operated rather than by the use of hydraulic or pneumatic power.

Figure 4:
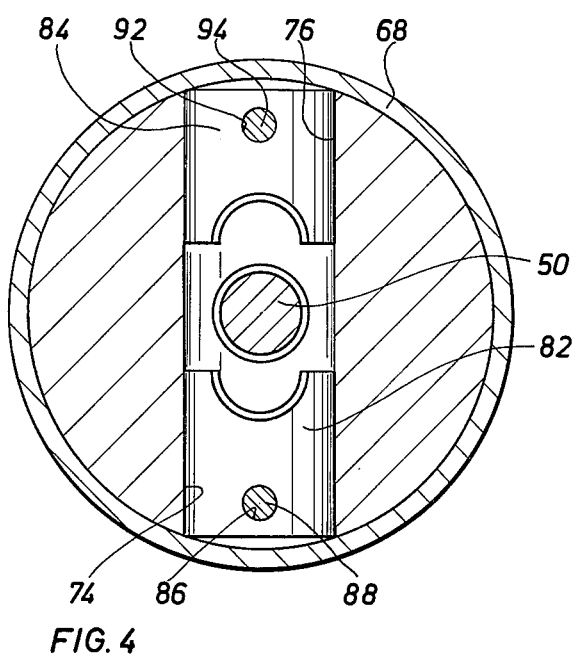
FIG. 4 is a view similar to FIG. 2 showing the drive nut means and the drive screw means disengaged.
Figure 5:
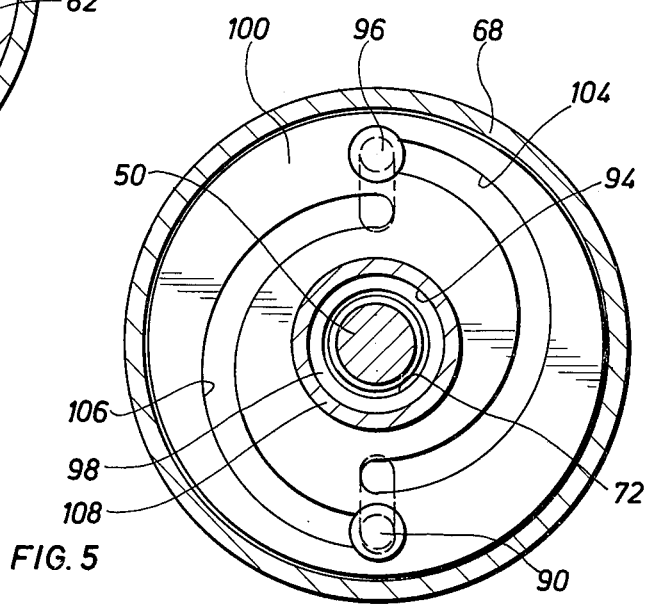
FIG. 5 is a view similar to FIG. 3 and shows the position of the camming plate when the drive nut means and drive screw means are disengaged.

Assuming now that it is desired to permit normal powered operation of actuator 12, manual override apparatus 10 is disengaged. This is accomplished in the following manner: knob 122 is rotated sufficiently to rotate cam plate 100 180° i.e. from the position shown in FIG. 3 to the position shown in FIG. 5. Rotation of cam plate 100 by knob 122 is accomplished by the rigid connection between plate 100 and knob 122 afforded by engaging rod 108. In the position shown in FIG. 5, camming pins 96 and 90 have now been moved laterally outwardly from drive screw 50 thus releasing threaded engagement of drive nut halves 82 and 84 and drive screw 50 (See FIG. 4). Drive screw 50 is now free to move axially to bores 110, 72 and 20 in response to the movement of piston 30 in actuator 12.

As previously noted, one of the advantages of the manual override apparatus of the present invention lies in its easy adaptability to a variety of different styles and sizes of actuators, particularly piston-cylinder type actuators. It is only necessary in a given actuator to remove one of the end caps, such as for example, end cap 24, and drill the necessary holes to provide for connection of the end cap to connecting flange 22 and permit passage of connecting rod 34 therethrough. It is then only necessary to tap piston rod 32 for receipt of the threaded end 40 of connecting rod 34. Thus, the manual override apparatus provides an easily adaptable modular unit which is compatible with many existing actuators without the necessity for extensive change out of actuator components.

It can thus be seen that the present invention is well adapted to carry out the specific objects recited above as well as those inherent therein. While certain preferred embodiments of the apparatus have been set forth in the foregoing disclosure, numerous modifications can be made by those skilled in the art without departing from the spirit and scope of the invention which is to be limited only by the appended claims.

I claim:

1. A selectively engageable manual drive apparatus comprising
a body having a bore therethrough,
a housing secured to said body and having an axial bore registering with said bore in said body,
rotatable split drive nut means in said housing,
drive screw means mounted for axial movement in said registering bores in said body and said housing, and,
camming means for selectively engaging and disengaging said drive nut means and said drive screw means whereby engagement of said drive nut means and said drive screw means and rotation of said drive nut means causes axial movement of said drive screw means.

2. The apparatus of claim 1 wherein said housing is rotatably secured to said body and is rotatable with said drive nut means.

3. The apparatus of claim 2 wherein said split nut has first and second halves mounted on diametrically opposite sides of said screw means.

4. The apparatus of claim 2 wherein said first and second halves are slidably mounted in opposed coaxial bores in said housing.

5. The apparatus of claim 1 wherein said drive screw means is substantially coaxial with said axial bore and includes means preventing relative rotation of said drive screw and said body.

6. The apparatus of claim 5 wherein said means for preventing said relative rotation comprises means for keying said drive screw means to said bore in said body.

7. The apparatus of claim 3 wherein said means for selectively engaging and disengaging includes a cam plate having a central opening therein, said central opening being in register with said axial bore in said housing, said cam plate having first and second cam surfaces eccentric with respect to said axial bore and each other, said engaging and disengaging means further including first and second camming pins engagable with said first and second cam surfaces, respectively, said first and second pins being affixed to said first and second halves, respectively, of said drive nut and being generally axially aligned with said drive screw, said cam plate being at least partially rotatable with respect to said housing around the longitudinal axis of said axial bore and said first and second cam surfaces being disposed such that relative rotation of said cam plate and said housing in one direction iffects equal and opposite movement of said first and second halves of said drive nut toward said drive screw and relative rotation of said cam plate and said housing in the other direction effects equal and opposite movement of said first and second halves of said drive nut away from said drive screw.

8. The apparatus of claim 7 wherein said camming surfaces are provided by arcuate slots in said plate.

9. The apparatus of claim 7 wherein said housing has an axially extending boss in generally surrounding relationship to said drive screw, said boss extending through said central opening in said plate.

10. The apparatus of claim 7 including a housing cover secured to said housing and rotatable therewith.

11. The apparatus of claim 10 including means external of said housing cover for rotating said cam plate.

12. In combination with a normally, automatically powered driving mechanism having a stationary member and a moveable member mounted for movement with respect to said stationary member, a manual control apparatus for effecting movement of said moveable member comprising:
a body having a bore therethrough,
means for securing said body to said stationary member,
a housing secured to said body and having an axial bore registering with said bore in said body,
rotatable split drive nut means mounted in said housing,
drive screw means mounted for axial movement in said registering bores,
connecting rod means connected to said drive screw means camming and said moveable member and,
means for selectively engaging and disengaging said drive nut means and said drive screw means whereby engagement of said drive nut means and said drive screw means and rotation of said drive nut means causes axial movement of said drive screw means thereby effecting movement of said moveable member.

13. The mechanism of claim 12 when said housing is rotatably secured to said body and is rotatable with said drive nut means.

14. The mechanism of claim 12 wherein said split nut has first and second halves mounted on diametrically opposite sides of said screw means.

15. The mechanism of claim 14 when said first and second halves are slidably mounted in opposed coaxial bores in said housing.

16. The apparatus of claim 14 wherein sad means for selectively engaging and disengaging includes a cam plate having a central opening therein, said central opening being in register with said axial bore in said housing, said cam plate having first and second cam surfaces eccentric with respect to said axial bore and each other, said engaging and disengaging means further including first and second camming pins being engageable with said first and second cam surfaces respectively, said first and second pins being affixed to said first and second halves, respectively of said drive nut and being generally axially aligned with said drive screw, said cam plate being at least partially rotatable with respect to said housing around the longitudinal axis of said axial bore and said first and second cam surfaces being disposed such that relative rotation of said cam plate and said housing in one direction effects equal and opposite movement of said first and second halves of said drive nut toward said drive screw and relative rotation of said cam plate and said housing in the other direction effects equal and opposite movement of said first and second halves of said drive nut away from said drive screw.

17. The mechanism of claim 12 whem said drive screw means includes means for preventing transfer of torsional loads from said drive screw to said normally, automatically powered driving mechanism.

18. Mechanism of claim 17 when said means for preventing transfer of torsional loads comprises means for keying said drive screw means to said bore in said body.

* * * * *

UNITED STATES PATENT OFFICE
CERTIFICATE OF CORRECTION

Patent No. 4,080,844            Dated March 28, 1978

Inventor(s) Henry Killian

It is certified that error appears in the above-identified patent and that said Letters Patent are hereby corrected as shown below:

Column 6, line 34, delete "sad" and insert --said--.

Column 6, line 57, delete "when" and insert -- when --.

Signed and Sealed this

Fourteenth Day of November 1978

[SEAL]

Attest:

RUTH C. MASON  
*Attesting Officer*

DONALD W. BANNER  
*Commissioner of Patents and Trademarks*